Patented Oct. 25, 1949

2,486,241

UNITED STATES PATENT OFFICE 2,486,241

METHOD FOR PREPARING POLYMERS AND COPOLYMERS OF ACRYLIC ACID NITRILES

Harold W. Arnold, Wilmington, Del., assignor to E. I. du Pont de Nemours & Company, Wilmington, Del., a corporation of Delaware No Drawing. Application September 17, 1942, Serial No. 458,711

4 Claims. (Cl. 260—85.5)

This invention relates to vinyl polymers and to a process for their production. More particularly, it relates to a new and improved method for the preparation of polymers and copolymers of acrylic acid nitriles.

Certain modifications of vinyl polymers containing acrylonitriles have attained considerable industrial importance as synthetic rubbers and valuable plastic masses. The attractive physical properties of these copolymers such as unusual toughness and high softening point are somewhat overshadowed by the difficulties encountered when preparing these products by methods already disclosed in the art. Acrylonitriles are characterized by rather slow rates of polymerization and, moreover, have been copolymerized only with great difficulty or not at all with certain unsaturated polymerizable compounds. Consequently, the production of acrylonitrile polymers and copolymers as taught by the art is a slow, uneconomical process which is not adaptable for efficient large scale production and frequently results in the formation of non-homogeneous products of inferior quality.

This invention has as its object the providing of a practical and economical method for the preparation of polymers and copolymers of acrylic acid nitriles. Another object is to develop a process for the preparation of such polymers and copolymers which is free of the disadvantages of the prior art such as poor yields and poor quality of the product. Still another object is to provide a method for the conjoint polymerization of acrylonitriles with certain monomers which were regarded as difficultly copolymerizable or as non-copolymerizable with said acrylonitriles. Another object is to provide a rapid and efficient process for the polymerization and copolymerization of acrylonitriles. Another object will be apparent from the following description of the invention.

These objects are accomplished by the following invention which comprises creating a dispersion of an acrylic acid nitrile, that is, acrylonitrile or a homolog, e. g., an alpha substituted acrylic acid nitrile, either alone or in admixture with at least one other polymerizable unsaturated compound, in an aqueous medium, said aqueous medium containing dissolved therein, as a polymerization catalyst, an oxygen-yielding substance and, as a polymerization adjuvant, an oxidizable sulfoxy compound. Under these conditions the polymerization reaction will proceed at a markedly rapid rate. It is preferred, however, that the reaction be carried out in a closed vessel containing a substantially oxygen-free gas space above the aqueous medium. If the dispersion is in the form of an emulsion, an acid-stable dispersing agent is preferably used. Acid-stable refers to solubilizing groups whose activity is unaffected in media of mild acidity, e. g. pH 3–5, and excludes soaps which are decomposed at this point to the free fatty acids and inorganic salts.

The customary mode of practicing this invention is as follows: An adqueous medium containing about 0.1 to 2% of a perdisulfate salt, about 0.05 to 0.5% of a polymerization adjuvant such as sodium bisulfite and about 1 to 5% of a suitable dispersing agent is placed in an appropriate pressure vessel which is provided with a means of agitation such as stirring or shaking. This is followed by the addition of the mixture of acrylonitrile and at least one other polymerizable unsaturated compound to be polymerized. The air in the free space of the vessel is displaced by an inert gas such as nitrogen and the vessel is then sealed. It is thereafter heated at a constant temperature in the range of 30° to 50° C. with continuous or intermittent agitation until polymerization has proceeded to the desired extent.

The following examples, in which parts are given by weight, further illustrate the practice of the invention.

EXAMPLE I

*50/50 acrylonitrile vinyl acetate copolymer*

The following solution is prepared:

| | Parts |
|---|---|
| A commercial dispersing agent containing about 23% active ingredient which consists mainly of the sodium salt of sulfonated "Cumar" resin | 174 |
| Sodium bisulfite | 1 |
| Water | 1,810 |
| Ammonium perdisulfate | 2.75 |
| Potassium secondary phosphate | 10 |

The pH of the solution is adjusted to 4.6. One hundred parts of this solution is placed in a suitable glass pressure vessel along with a mixture of 12.5 parts of acrylonitrile and 12.5 parts of vinyl acetate. The free space of the vessel is flushed out with nitrogen and the vessel is closed. It is then shaken continuously at 40° C. for 2 hours. The resulting dispersion is diluted with an equal volume of distilled water, heated to a temperature of approximately 85° C., and the polymer precipitated by the addition with vigorous stirring of 10 parts of 10% aluminum sulfate solution. Heating is continued for a short time and the polymer is then separated by filtration. It is washed thoroughly with water to remove traces of electrolyte and then dried. The yield amounts to 16.5 parts or 66% of theory. A specimen of this product molded at 160° C. and 2000 lbs. per sq. in. pressure, is light colored, tough and possesses high stiffness, good hardness and excellent impact strength. The softening point of this copolymer is 87° C.

In a similar experiment in which the sodium bisulfite is omitted, a yield of only 58.5% is obtained after 40 hours at 40° C.

EXAMPLE II

*65/35 acrylonitrile/methyl acrylate copolymer*

The following dispersing solution is prepared:

| | Parts |
|---|---|
| Water | 260 |
| The dispersing agent described in Example I | 26 |
| Ammonium perdisulfate | 0.6 |
| Sodium bisulfite | 0.5 |
| Sodium primary phosphate | 0.8 |

The pH of the solution is adjusted to 4.6. One hundred parts of this solution is introduced into a suitable pressure vessel along with a mixture of 32.5 parts of acrylonitrile and 17.5 parts of methyl acrylate. The vessel is flushed with nitrogen, sealed and heated at 40° C. for 2 hours with continuous agitation. The polymer is isolated as in the preceding example. The yield of dry copolymer amounts to 40 parts or 80% of theory. Specimens of the polymer molded at 160° C. and 2000 lbs./sq. in. pressure are exceedingly tough. This product has the properties tabulated below:

| | |
|---|---|
| Softening point | 78° C. |
| Stiffness | 1.24 mm. |
| Impact strength | 0.59 ft. lbs./in. of notch |
| Tensile strength | 11,000 lbs./sq. in. |
| Flexural strength | 20,000 lbs./sq. in. |
| Water absorption (ASTM) | 0.3% |

In a similar experiment in which sodium bisulfite is omitted, the yield in 18 hours is 89.5%.

EXAMPLE III

*50/50 acrylonitrile/vinyl acetate copolymer*

The following dispersing solution is made up:

| | Parts |
|---|---|
| Water | 585 |
| A commercial dispersing agent containing about 98% active ingredient which consists mainly of the sodium salt of isopropylated naphthalene sulfonate | 12 |
| Ammonium perdisulfate | 1.5 |
| Sodium bisulfite | 0.5 |

The pH of the solution is adjusted to 4.6 by the appropriate addition of sodium primary phosphate. Four hundred parts of the solution are placed in a stainless steel autoclave with a mixture of 50 parts of acrylonitrile and 50 parts of vinyl acetate. The container is flushed with nitrogen, sealed and subjected to 400 lbs. of nitrogen pressure. It is then agitated continuously at 45° C. for 8 hours. The polymer is isolated as described above and amounts to 100 parts of 100% of theory. Molded specimens of the polymer soften at 80° C. and have an impact strength of 0.59 ft. lbs./in. of notch. The polymer possesses good flow properties and is quite suitable for injection molding.

In a similar experiment in which sulfur dioxide is substituted for sodium bisulfite, the yield of copolymer is almost identical.

EXAMPLE IV

*50/50 acrylonitrile/vinyl acetate copolymer*

The following dispersing solution is prepared:

| | Parts |
|---|---|
| Water | 1,360 |
| The dispersing agent described in Example III | 29 |
| Ammonium perdisulfate | 1.2 |
| Sodium bisulfite | 0.5 |
| Sodium primary phosphate | 10 |

The pH of the solution is adjusted to 4.6 and the solution then placed in a suitable pressure vessel. After the introduction of 350 parts of vinyl acetate and 50 parts of acrylonitrile, the free space of the vessel is flushed with nitrogen and the vessel sealed. It is then heated at 36° to 40° C. with continuous stirring. Samples of the polymer dispersion are removed at various intervals for specific gravity determinations. Further quantities of acrylonitrile, ammonium perdisulfate, and sodium bisulfite are added at the following specific gravities (25° C.):

| Specific Gravity 25° C. | Acrylonitrile Parts | Ammonium Perdisulfate, Parts | Sodium bisulfite, Parts |
|---|---|---|---|
| 0.998 | | 0.6 | 0.08 |
| 1.000 | 42.8 | | |
| 1.009 | 42.8 | | |
| 1.017 | 42.8 | | |
| 1.020 | | 0.6 | 0.32 |
| 1.023 | 42.8 | | |
| 1.036 | 42.8 | | |
| 1.042 | 42.8 | | |
| 1.046 | | 1.2 | .4 |
| 1.052 | 42.8 | | |

The entire polymerization requires 5 hours. The polymer is isolated as described in Example I and amounts to 600 parts or an 86% yield. The product differs from that prepared as in Example I by being readily soluble in acetone. Fibers having good strength can be spun from the acetone solution by the dry or wet spinning process. Films having excellent appearance and attractive physical properties can be cast from acetone solution. The polymer may also be used in injection molding applications.

EXAMPLE V

*45/10/45 acrylonitrile/methyl acrylate/vinyl acetate copolymer*

The following dispersing solution is prepared:

| | Parts |
|---|---|
| Water | 1,360 |
| The dispersing agent described in Example III | 29 |
| Ammonium perdisulfate | 3.6 |
| Sodium bisulfite | 1.0 |
| Sodium primary phosphate | 10 |

The pH of the solution is adjusted to 4.6. One hundred parts of this solution is placed in a suitable pressure vessel along with a mixture consisting of 22.5 parts of acrylonitrile, 22.5 parts of vinyl acetate and 5 parts of methyl acrylate. The vessel is swept with nitrogen, sealed and then heated at 40° C. for 17 hours with agitation. The product is isolated as in Example I and the yield of polymer amounts to 45.5 parts or 91% of theory. The polymer possesses good toughness and color as well as excellent flow characteristics.

EXAMPLE VI

*Acrylonitrile/methacrylic ester copolymers*

The following dispersing solution is made up:

|  | Parts |
|---|---|
| Water | 685 |
| The dispersing agent described in Example III | 14.5 |
| Ammonium perdisulfate | 3.0 |
| Sodium bisulfite | 1.8 |

A series of polymerization mixtures are introduced into polymerization vessels. Each mixture comprises 100 parts of the dispersing solution described above, 30 parts of acrylonitrile and 20 parts of the copolymerization ingredients listed in Table I below. The air in the polymerization vessels is then displaced with nitrogen, the vessels sealed and shaken for 2 hours at 40° C. The yield of polymer produced in each mixture is given in Table I.

TABLE I

*Acrylonitrile/methacrylic ester copolymers (60/40)*

| Type | Yield | Appearance |
|---|---|---|
| Acrylonitrile-ethyl methacrylate. | 98 | Clear, light colored, brittle. |
| Acrylonitrile-propyl methacrylate. | 96 | Clear, light colored, very brittle. |
| Acrylonitrile-butyl methacrylate. | 100 | Clear, yellow colored, brittle. |
| Acrylonitril-isobutyl methacrylate. | 96 | Clear, very light yellow. |
| Acrylonitrile-methoxyethyl methacrylate. | 100 | Clear, light colored. |

EXAMPLE VII

*Polyacrylonitrile*

The following dispersing solution is prepared:

|  | Parts |
|---|---|
| Water | 270 |
| The dispersing agent described in Example I | 26 |
| Ammonium perdisulfate | 0.6 |
| Sodium bisulfite | 0.5 |
| Sodium primary phosphate | 0.8 |

The pH of the solution is adjusted to 4.6. One hundred parts of this solution is introduced along with 50 parts of acrylonitrile into a suitable pressure vessel. The air in the vessel is then displaced with nitrogen, the vessel sealed and heated at 40° C. for two hours. The polymer is isolated as described in Example I and amounts to 42.5 parts or 85% of theory.

EXAMPLE VIII

*28/72 acrylonitrile/asymmetrical dichloroethylene copolymer*

The following dispersing solution is prepared:

|  | Parts |
|---|---|
| Water | 1,287 |
| A commercial dispersing agent containing about 32% active ingredient which consists mainly of the sodium salt of sulfonated paraffin white oil | 109 |
| Ammonium perdisulfate | 3.5 |
| Sodium bisulfite | 0.5 |

The pH of the solution is adjusted to 2.5 by the appropriate addition of formic acid. This solution is then placed in a suitable pressure vessel along with 196 parts of acrylonitrile and 504 parts of asymmetrical dichloroethylene. The vessel is flushed with nitrogen, sealed and shaken at 38° C. for 24 hours. The polymer is isolated as in Example I and amounts to 580 parts or 90.8% of theory. The polymer may be molded to light colored, very tough sheets. It contains 72.4% asymmetrical dichloroethylene.

In a similar experiment in which sodium bisulfite is omitted and the polymerization is carried out at 40° C. for 43 hours the yield of copolymer is 89%.

EXAMPLE IX

*Equimolar acrylonitrile/methacrylonitrile copolymer*

The following dispersing solution is prepared:

|  | Parts |
|---|---|
| Water | 778 |
| The dispersing agent described in Example III | 16.5 |
| Ammonium perdisulfate | 2 |
| Sodium bisulfite | 0.7 |

The pH of the solution is adjusted to 4.6. One hundred parts of this solution is placed in a suitable pressure vessel along with 22 parts of acrylonitrile and 28 parts of methacrylonitrile. The air in the vessel is displaced with nitrogen, the vessel sealed and then shaken at 45° C. for 44 hours. The yield of copolymer amounts to 46 parts or 92%.

EXAMPLE X

*44/44/12 acrylonitrile/vinyl chloride/methyl acrylate copolymer*

The following dispersing solution is prepared:

|  | Parts |
|---|---|
| Water | 655 |
| The dispersing agent described in Example VIII | 44 |
| Ammonium perdisulfate | 1.05 |
| Sodium bisulfite | 0.35 |

One hundred parts of this solution is placed in a suitable pressure vessel and the contents cooled below the boiling point of monomeric vinyl chloride. A mixture of 22 parts of acrylonitrile, 6 parts of methyl acrylate and 22 parts of vinyl chloride is then added in the order named. The free space of the vessel is flushed out with nitrogen, the vessel sealed and shaken at 40° C. for 17 hours. The product is isolated in the usual manner and amounts to 46 parts or 92% of theory. Molded specimens are clear, light colored and tough. The copolymer has a softening temperature of about 80° C.

The above examples demonstrate the unusual extremely rapid polymerization and copolymerization of acrylic acid nitriles obtained when using the present invention. It should be pointed out that the combinations of catalyst-adjuvant employed herein are both unique and superior, as it is not possible to attain such marked acceleration of polymerization of acrylic acid nitriles by any other means. This increase of rate of polymerization is accomplished without sacrifice of quality of products.

EXAMPLE XI

50/50 acrylonitrile/vinyl acetate copolymer

The following dispersing solution is prepared:

| | Parts |
|---|---|
| Water | 375 |
| The dispersing agent described in Example VIII | 18.7 |
| The sodium salt of sulfonated naphthalene-formaldehyde condensation product | 2 |
| Ammonium perdisulfate | 1.65 |
| Potassium primary phosphate | 3 |
| Sodium hyposulfite | 2.8 |

The pH of the solution is adjusted to 4.6. Fifty parts of this solution is then placed in a suitable pressure vessel along with 12.5 parts of acrylonitrile and 12.5 parts of vinyl acetate. The free space of the vessel is flushed with nitrogen, the vessel sealed and then heated at 45° C. with agitation for 1.5 hours. Isolation of the copolymer as in Example I yields 12.9 parts or 51.2% of theory. In a similar experiment in which the sodium hyposulfite is omitted, the yield of copolymer at the end of 1.5 hours is only 10%.

EXAMPLE XII

50/50 acrylonitrile/vinyl acetate copolymer

The following dispersing solution is prepared:

| | Parts |
|---|---|
| Water | 195 |
| The dispersing agent described in Example III | 4 |
| Ammonium perdisulfate | 0.5 |
| An aqueous solution containing 6.9% sulfur dioxide | 1.9 |

The pH of the solution is adjusted to 4.6. One hundred parts of this solution is placed in a suitable pressure vessel along with 25 parts of acrylonitrile and 25 parts of vinyl acetate. The vessel is flushed with nitrogen, sealed and agitated for 5 hours at 40° C. The product is isolated as in Example I and amounts to 39.9 parts or 79.8% of theory. In a similar experiment in which the sulfur dioxide is omitted, the yield of polymer is only 15% of theory.

This invention is generic to the polymerization of nitriles of acrylic acid and its homologues such as alpha-methacrylonitrile, alpha-ethacrylonitrile, alpha-phenyl acrylonitrile, alpha-chloroacrylonitrile and the like. As indicated in the foregoing examples the process is also applicable for the conjoint polymerization of acrylic acid nitriles in mixture with each other and/or with at least one other polymerizable unsaturated compound.

This provides an uniquely effective means for obtaining high quality copolymers of acrylic acid nitriles with the following substances: Methyl methacrylate, ethyl methacrylate, butyl methacrylate, octyl methacrylate, 2-nitro-2 methyl propyl methacrylate, methoxyethyl methacrylate, chloroethyl methacrylate, phenyl methacrylate, cyclohexyl methacrylate, and the corresponding esters of acrylic acid; acryl- and methacrylamide or monoalkyl substitution products thereof; unsaturated ketones such as methyl vinyl ketone, phenyl vinyl ketone and methyl isopropenyl ketone; asymmetrical di-halogenoethylenes such as asymmetrical dichloroethylene; vinyl carboxylates such as vinyl acetate, vinyl chloroacetate, vinyl propionate, vinyl butyrate and vinyl stearate; ethylene-alpha-beta dicarboxylic acids, or their anhydrides or derivatives such as maleic anhydride, fumaric esters, maleic esters, citraconic esters and mesaconic esters; vinyl carbazole, vinyl ethers; monoolefines and substitution products thereof as styrene, isobutylene, dimethyl vinylethynyl carbinol and the like. With regard to copolymerization, this invention is chiefly concerned with mixtures of acrylic acid nitriles and one other operable monomer which contain from 5 to 95% of the acrylonitrile by weight. It is apparent that the properties of the copolymers will depend largely on the type and amount of the other ingredient to be copolymerized with the acrylonitrile. It is within the scope of this invention to polymerize the acrylic acid nitriles conjointly with two or more compounds which contain an ethylenic bond capable of vinyl polymerization.

The polymerization catalysts encompassed by this invention include oxygen-liberating substances in general and especially the water-soluble salts of perdisulfuric acid. In addition to the ammonium salt disclosed in the examples, there may also be used the sodium, potassium, lithium, barium, magnesium, and calcium perdisulfates. Other oxygen-liberating substances which may be used include benzoyl peroxide, acetyl peroxide, hydrogen peroxide and peracetic acid. It is observed that the sulfate ion appears in aqueous solutions of perdisulfates. For this reason, while the water-soluble alkaline earth metal salts are operable, they are not usually used because of their tendency to form a precipitate of the corresponding alkaline earth sulfate. The preferred salts are the ammonium and alkali metal salts. Ammonium perdisulfate is especially suited for economic considerations.

The concentration of perdisulfate salt employed may be varied within wide limits. For instance, amounts of perdisulfates varying from 0.1% to 10% of the quantity of monomer employed are operable. In respect to economy of catalyst, quality of product, and rapidity of polymerization, the preferred proportion of perdisulfate salt lies in the range of 0.1% to 4% based on the total weight of monomers employed.

The polymerization adjuvants operable in the invention are defined as oxygen-containing sulfur compounds capable of undergoing oxidation, which promote extremely rapid polymerization of acrylic acid nitriles when used in combination with a perdisulfate catalyst in the presence or absence of dispersing agents of the type described heretofore. In addition to the inorganic oxidizable sulfoxy compounds, sodium bisulfite, sulfur dioxide, and sodium hydrosulfite, as shown in the examples, other oxidizable sulfoxy compounds may be used as an adjuvant such as, for example, the inorganic oxidizable sulfoxy compound sodium thiosulfate, and the organic oxidizable sulfoxy compounds, diethyl sulfite, formamidine sulfinic acid and para-toluene sulfinic acid. The concentration of the adjuvant employed may be varied within wide limits. For instance, amounts of adjuvants varying from 0.001% to 5% of the quantity of monomer employed are operable. In respect to optimum operating conditions and rapidity of polymerization, the preferred proportion of adjuvant lies in the range of 0.05 to 0.5% based on the weight of monomer. The addition of the adjuvant to the reaction mixture is frequently attended with a marked increase in temperature and care must be taken to remove the excessive heat generated in such cases. The total quantity of adjuvant may be added initially to the reaction mixture or in small proportions during the course of polymerization. The latter method affords a convenient procedure for regulating the amount of heat usually generated by adjuvant addition.

While it is preferred to carry out the present invention in the presence of a dispersing agent, the process may be conducted in aqueous dispersions in the absence of any added dispersant.

Surface-active agents are frequently divided into four classes depending on which portion of the molecule contains the active group. These four classes are the following: Anionic (as soaps), cationic (as cetyl pyridinium bromide), hybrid (as betaine-type compounds), and nonionic (as the products obtained in the reaction of long chain alcohols with ethylene oxide). Any of these types of dispersing agent may be used in the emulsion polymerization and copolymerization of acrylic acid nitriles according to the present invention provided they are not decomposed under the conditions employed. Sodium, potassium, and ammonium salts of long-chain aliphatic carboxylic acids are not suitable because of the ease with which they are decomposed with acids. Suitable agents include sodium dodecyl sulfate, sodium hexadecyl sulfate, sodium tetradecyl sulfate, sodium octadecyl sulfate, sodium octadecenyl sulfate, sodium acetoxyoctadecane sulfate, sodium tetradecane-1-sulfonate, sodium octadecane-1-sulfonate, sodium alkylnaphthalene sulfonates, C-cetyl betaine, hydroxypropyl C-cetyl betaine, dodecyl trimethylammonium bromide, stearyl trimethylammonium bromide, the diethyl cyclohexylamine salt of hexadecyl sulfuric ester, partially saponified polyvinyl acetate, the sodium salt of methacrylic acid/methyl methacrylate copolymer and the like. The salts of long chain sulfonated paraffin oil hydrocarbons are especially effective dispersants, and need be employed only in small proportions to achieve the desired results. It will be understood that the dispersants to which reference is made above are commercial materials which, because of the methods used in their manufacture and because of the sources of the starting materials, are usually not produced in high state of purity and may contain minor constituents which influence the effectiveness of the active ingredient. Polymerization systems containing such ancillary ingredients, which are present adventitiously or added deliberately, are recognized as part of this invention. These ingredients, which are useful only when an operable dispersant is also present, may include inorganic salts, long chain primary alcohols, carbohydrate derivatives, polyvinyl alcohol, etc.

Using the rate of polymerization as a criterion, the invention encompasses the use of dispersing agent active ingredients in concentrations of 0.2 to 5% based on the weight of the aqueous medium in which the polymerization and copolymerization of acrylic acid nitriles is brought about. Within this range the preferred concentration will, in general, depend upon the proportion of monomer present, but is usually from 0.5 to 4%. From the standpoint of economy and to facilitate removing the dispersing agent from the polymerized product, it is customary to use the least amount of dispersing agent necessary to bring about the desired rate of polymerization. It is to be understood that when reference is made to the use of definite percentages of dispersing agents, these values are calculated on the basis of the known active ingredient concentration in the commercial dispersants.

It may also be pointed out that the effectiveness of the dispersing agent, especially if small concentrations are employed, is enhanced by agitation of the mixture. Any method of agitation may be used in producing and maintaining the emulsions. The most commonly employed method of mixing is stirring, preferably in vessels containing suitable baffles. Other methods include shaking, tumbling and the use of turbomixers. The dispersing agents operable in this invention are in general useful in forming stable emulsions, which after they are once formed, require little or no agitation thereafter. It has been found, however, that polymerization occurs more rapidly in certain emulsions while they are being agitated. It is, accordingly, preferred to assist the dispersing agent in producing and maintaining the emulsion by mechanical means which may or may not be continuous.

The process of the invention may be carried out in alkaline, acid or neutral media. However, it is preferred to carry out the polymerization in an aqueous medium whose pH may vary from about 1 to about 5 since the range appears to enhance the polymerization of acrylic acid nitriles. It is realized, however, that in copolymerizations, the pH of the aqueous media will be governed to a considerable degree by the nature of the monomer which is conjointly polymerized with the acrylic acid nitriles. For example, when vinyl esters of carboxylic acids are employed care must be taken to prevent the hydrolysis of the ester. Since the polymerization, in general, proceeds more slowly in environments of low acidity and since high acidity may cause excessive corrosion of the polymerization vessel, it is preferred to conduct polymerization in aqueous media with pH values of about 2 to about 5. If it is desired to avoid pH changes during the course of the polymerization, suitable buffers may be added to the aqueous medium.

The operability of the invention is not confined to any particular proportion of polymerizable monomer or monomers relative to the amount of aqueous media present. Thus, the ratio of the aqueous to the non-aqueous phase may vary between approximately 10:1 and 1:1. In general, it is preferred to employ aqueous/non-aqueous ratios between approximately 4:1 and 1:1 since for a given reaction vessel the time-space yield is greatly reduced by the use of higher ratios. It can further be said that higher aqueous/non-aqueous ratios generally tend to favor the production of lower molecular weight products. It is also helpful in maintaining an emulsion if the proportion of non-aqueous to aqueous phases is not greater than 1:1.

As is well known, the dependence of the rate of vinyl polymerization upon the temperature is very important, and low temperatures cannot be generally used because the corresponding rate of reaction is impracticably low. The present invention can be operated at any temperature above the freezing point of the aqueous phase which is somewhat below 0° C. to the boiling point of the solution which, of course, will vary with the pressure.

It is realized that the presence of oxygen in the polymerization vessel, while not appearing to have a deleterious effect on the properties of the polymers of this invention, may retard the rate of polymerization in certain cases. In these cases it is, therefore, preferable to displace the air from the polymerization vessel by means of a gas which does not reduce the rate of polymerization. Suitable gases are nitrogen, carbon dioxide, methane and helium. These gases may be passed through the free space of the polymerization vessel until the air has been completely displaced or may be introduced under sufficiently high pressure that the oxygen originally present is so greatly diluted as to have little effect on the rate of polymerization. Moreover, the presence of the polymerization adjuvant according to the present invention appears to overcome somewhat the deleterious effect of molecular oxygen on the polymerization rates of the systems employed herein.

The process is not limited to any particular apparatus but it is important that the reaction vessel shall be constructed of material which has no effect on the rate of polymerization or on the quality of the products and is not affected by the aqueous medium used in carrying out the polymerization. Suitable vessels may be constructed of stainless steel, nickel, silver, or lead. Vessels equipped with glass or enamel liners may also be used.

The copolymerization procedure generally followed in the present invention involves the addition of the entire amounts of each of the two polymerizable compounds to the aqueous medium followed by subsequent emulsification and polymerization of the aqueous dispersion. It is well known that the polymerization rate of the monomers operable in this invention may vary to a considerable extent, and it may also be found in copolymerizing acrylonitrile with one of the operable monomers, that one of the monomeric materials polymerizes more rapidly than the other, thus giving rise to products which may be characterized by non-homogeneity and other inferior physical properties. These effects are avoided to a great extent by using the invention. However, if additional improvement is desired, the polymerization process may be modified by mixing initially all of the more slowly polymerizing material and a small proportion of the more rapidly polymerizing monomer in the aqueous medium, and thereafter adding small portions of the more rapidly polymerizing monomer at about the rate at which this material is used up. The emulsion process of this invention is also adapted to be carried out in a continuous fashion.

At the conclusion of polymerization the products of this invention may be isolated as finely divided powders by a variety of methods. For example, the dispersion may be sprayed into a heated and/or evacuated chamber whereby the water is removed as vapor and the polymer falls to the bottom of the chamber. The polymer may also be isolated by cooling the dispersion below the freezing point of the aqueous medium or by the addition of a large volume of a lower aliphatic alcohol such as methanol or ethanol. The most satisfactory method consists in adding an appropriate amount of an electrolyte solution to the diluted aqueous dispersion with rapid agitation at a temperature just below the point at which the precipitated particles tend to cohere. This procedure yields a polymer in the form of dense granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the polymer it is filtered and washed repeatedly with water to remove traces of electrolyte and dispersing agent which may adhere to the particles. Washing with dilute solutions (0.1 to 1%) of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol such as methanol or ethanol.

The products prepared according to the present invention may be used for the preparation of plastics, coatings, films, foils, fibers, and adhesives. For any of these purposes, the polymer may be combined with or prepared in the presence of plasticizers, stabilizers, fillers, pigments, dyes, softeners, natural resins or other synthetic resins.

In event the products are to be used as coating or impregnating agents for porous materials, it is possible to apply the emulsions directly to the material to be coated without the intermediate isolation of the polymer.

As many apparently widely different embodiments of this invention may be made without departing from the spirit and scope thereof, it is to be understood that this invention is not to be limited to the specific embodiments shown and described.

I claim:

1. A process for the production of a copolymer of an acrylic acid nitrile with a polymerizable unsaturated compound containing a single ethylenic double bond which consists in creating a dispersion of said polymerizable unsaturated compound in admixture with from 5% to 95%, based on the total quantity of monomer present, of a nitrile of monounsaturated monocarboxylic acid having a methylene group attached by a double bond to its alpha-carbon atom in an aqueous medium in which the ratio of aqueous to non-aqueous phase ranges between 10:1 and 1:1 and which contains from 0.1% to 10%, based on the quantity of monomer present, of an oxygen-yielding peroxy compound and from .001% to 5%, based on the quantity of monomer present, of an alkali-metal sulfite and then effecting polymerization of said nitrile and said polymerizable unsaturated compound in said dispersion by maintaining the same at a temperature ranging from 0° C. to its boiling point.

2. A process for copolymerizating acrylonitrile and a vinyl ester of a saturated monocarboxylic acid which consists in dispersing said ester and from 5% to 95%, based on the total quantity of monomer present, of said acrylonitrile in an aqueous medium in which the ratio of aqueous to non-aqueous phase is between 4:1 and 1:1, said medium containing, by weight, from 0.1% to 4%, based on the quantity of monomer present, of ammonium perdisulfate and from .05 to 0.5%, based on the quantity of monomer present, of sodium bisulfite, and then effecting polymerization of said ester and said acrylonitrile by maintaining the resulting dispersion, while in contact with nitrogen, at a constant temperature ranging from 30-50° C. until polymerization is completed.

3. A process for the production of a copolymer which consists in polymerizing an ester of a monounsaturated aliphatic monocarboxylic acid having a methylene group attached by a double bond to its alpha-carbon atom in admixture with from 5% to 95%, based on the total quantity of monomer present, of a nitrile of a monounsaturated monocarboxylic acid having a methylene group attached by a double bond to its alpha-carbon atom in an aqueous dispersion, the aqueous medium of which has a pH value ranging from 1 to 5, a ratio of aqueous to non-aqueous phase of between 10:1 and 1:1, and contains from 0.1% to 10%, based on the quantity of monomer present, of an oxygen-yielding peroxy compound and from .001% to 5%, based on the quantity of monomer present, of an alkali metal sulfite and then effecting polymerization of said ester and said nitrile in said dispersion by maintaining the same at a temperature ranging from 0° C. to its boiling point.

4. A process for the production of a copolymer which consists in polymerizing a halogen containing polymerizable unsaturated compound containing a single ethylenic double bond in admixture with from 5% to 95%, based on the total quantity of monomer present, of a nitrile of a monounsaturated monocarboxylic acid having a methylene group attached by a double bond to its alpha-carbon atom in an aqueous dispersion, the aqueous medium of which has a pH value ranging from 1 to 5, a ratio of aqueous to non-aqueous phase of between 10:1 and 1:1, and contains from 0.1% to 10%, based on the quantity of monomer present, of an oxygen-yielding peroxy compound and from .001% to 5%, based on the quantity of monomer present, of an alkali metal sulfite and then effecting polymerization of said polymerizable unsaturated compound and said nitrile in said dispersion by maintaining the same at a temperature from 0° C. to its boiling point.

HAROLD W. ARNOLD.

REFERENCES CITED

The following references are of record in the file of this patent:

UNITED STATES PATENTS

| Number | Name | Date |
|---|---|---|
| 2,066,331 | Carothers et al. | Jan. 5, 1937 |
| 2,231,905 | Hanford et al. | Feb. 18, 1941 |
| 2,248,107 | Meisenburg et al. | July 8, 1941 |
| 2,264,376 | Hiltner et al. | Dec. 2, 1941 |
| 2,284,280 | Habgood | May 26, 1942 |
| 2,356,925 | Fryling | Aug. 29, 1944 |
| 2,379,431 | Fryling | July 3, 1945 |

FOREIGN PATENTS

| Number | Country | Date |
|---|---|---|
| 514,912 | Great Britain | Nov. 21, 1939 |

Certificate of Correction

Patent No. 2,486,241 — October 25, 1949

HAROLD W. ARNOLD

It is hereby certified that errors appear in the printed specification of the above numbered patent requiring correction as follows:

Column 2, line 10, for "adqueous" read *aqueous*; line 32, for "acrylonitrile vinyl" read *acrylonitrile/vinyl*; column 4, line 67, for "1.0" read *1.2*; column 5, Table 1, first column thereof, fourth item, for "Acrylonitril-isobutyl" read *Acrylonitrile-isobutyl*; column 12, line 51, for "copolymerizating" read *copolymerizing*;

and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*